Feb. 24, 1970   J. H. HILL   3,496,975
RATCHET-TYPE NUTCRACKER
Filed March 1, 1968

INVENTOR:
James H. Hill

United States Patent Office 3,496,975
Patented Feb. 24, 1970

3,496,975
RATCHET-TYPE NUTCRACKER
James Henry Hill, 209 N. 9th St., Okemah, Okla. 74859
Filed Mar. 1, 1968, Ser. No. 709,536
Int. Cl. A47j 43/26
U.S. Cl. 146—15
8 Claims

ABSTRACT OF THE DISCLOSURE

A nutcracker having a pistol grip handle and a spring loaded trigger cooperating therewith and carrying a ratchet dog which pivots when the trigger is pulled toward the handle. The ratchet dog engages ratchet teeth on a ratchet rod which is advanced toward a receiving cup to effect cracking of a nut placed between the ratchet rod and receiving cup. The receiving cup and one end of the ratchet rod which is advanced toward the cup are located in a nut chamber which has a nut tray forming the bottom thereof and pivotally supported by side walls of the nut chamber so that it can be pivoted to an emptying position after the nut is cracked.

BACKGROUND OF THE INVENTION

Field of the invention

This invention relates to a nutcracker, and more particularly, to a pecan nutcracker which will crack large or small, long or short, hard- or soft-shelled nuts quickly and completely.

Brief description of the invention

The nutcracker of the invention comprises a handle, a trigger pivotally mounted on the handle and carrying a dog which cooperates with and advances a ratchet rod when the trigger is pivoted, and a nut chamber into which one end of the ratchet rod is advanced. The ratchet rod cooperates with anvil means located in the nut chamber to crack a nut positioned therein, and the cracked nut comes to rest on a movable nut receiving tray forming the bottom wall of the nut chamber. The nut tray is pivotally mounted on the side walls of the nut chamber so that it can be pivoted away from the chamber to release the cracked nut.

It is an object of the invention to completely crack nuts within a chamber preventing shells or particles from flying or falling from the chamber while the nuts are being cracked.

A further object of this invention is the production of a simple and efficient nutcracker, small and compact, but easy to handle and operate.

A further object of the invention is to provide a nutcracker device in which nuts are quickly and easily gravity released from the device after cracking.

DETAILED DESCRIPTION OF A PREFERRED EMBODIMENT OF THE INVENTION

Figures 1, 2:
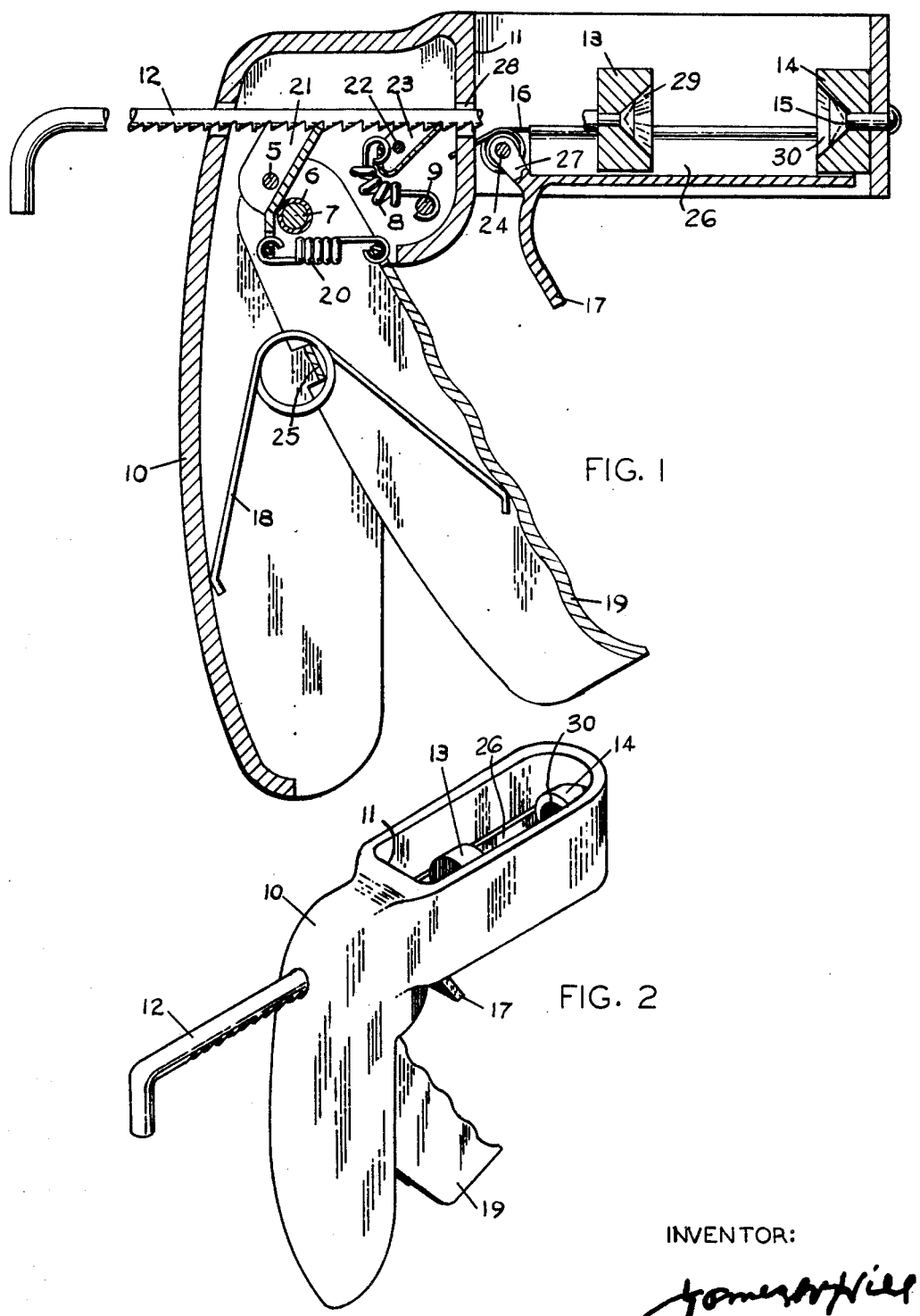
FIGURE 1 is a longitudinal vertical sectional view of the nutcracker of the invention.
FIGURE 2 is a pictorial view of the nutcracker.

Referring to the drawing in detail, it will be seen that numeral 10 designates a one piece main frame, hereinafter referred to as frame 10. The lower portion of the frame 10 is shaped as a pistol grip handle to fit the palm of the hand. The upper and forward portion of the frame 10 is designated as a nut chamber with a transverse wall 11 forming the back end of the nut chamber and acting as a guide for a ratchet rod 12 as shown in FIGURE 1. A trigger 19, which is of one piece construction and is hollow, has its forward portion formed as a finger grip. The trigger 19 is pivotally mounted on a cylindrical sleeve 6 which in turn rotates about a pivot pin 7. The pivot pin 7 has its ends press-fitted into the side walls of the frame 10.

A trigger pressure spring 18 is attached to the trigger 19 by a bar 25 which extends across the back of the trigger 19 as shown in FIGURE 1. The trigger spring 18 has two free ends extending downwardly from the central convolutions thereof, one end extending into the hollow of the pistol grip handle of the frame 10, and the other end folding into the hollow of the trigger 19. The trigger spring 18 is under compression at all times, thus biasing the trigger 19 forward into an open position.

A ratchet dog 21 is secured in the top end of the trigger 19 and is mounted for pivotation on a pivot pin 5. An extension spring 20 has one of its ends hooked into the lower end of the ratchet dog 21 and its other end hooked to the forward wall portion of the trigger 19.

A pressure dog 23 is pivotally mounted on a pivot pin 22, which pin has its ends press-fitted into the walls of the frame 10 forward of the location of the pivot pin 5 about which the ratchet dog 21 pivots. An extension spring 8 has one end hooked to the lower end of the pressure dog 23 so as to bias the pressure dog in a countercockwise direction about the pivot pin 22. The other end of the extension spring 8 is hooked to a pin 9 extended between the opposed walls of the frame 10 just behind the transverse wall 11 of the nut chamber.

The ratchet rod 12 which extends between the walls of the frame 10 and through the transverse wall 11 of the nut chamber is a one-piece L-shaped member having a nut down turned end portion at its end outside the frame 10, and having an elongated portion passing through a relatively snug fitting circular opening 28 in the transverse wall 11 of the frame 10. The ratchet rod 12 passes over the top of the ratchet dog 21 and the pressure dog 23, through the circular opening 28 in the transverse wall 11 and into the nut chamber. At its end in the nut chamber, the ratchet rod 12 is threadedly engaged with a crusher cup 13 which is cylindrical and contains a nut receiving conical depression 29 facing away from the ratchet rod 12.

A receiving cup 14 which is also cylindrically shaped and provided with a conical nut receiving depression 30 therein is secured to the frame 10 and faces the crusher cup 13. The nut receiving cup 14 is held to the frame 10 by a rivet 15 and cooperates in a manner hereinafter described with the crusher cup 13 for cracking nuts during operation of the nut cracker.

A nut receiving tray 26 having a finger tip trigger 17 formed integrally therewith fits snugly in the bottom opening of the nut chamber to form a bottom wall in the nut chamber and to receive nuts cracked between the crusher cup 13 and the nut receiving cup 14. The nut receiving tray 26 has an extension 27 through which a pivot pin 24 is extended for pivotally supporting the tray and finger tip trigger 17 between the side walls of the frame 10 which form the nut chamber. The pivot pin 24 passes through a spring 16 and has its ends press-fitted in the walls of the frame 10. An end of the spring 16 is retained in a rolled over upper edge portion of the nut tray 26, and another free end of the spring 16 is extended through a small aperture provided in the transverse wall 11. The spring 16 thus biases the nut receiving tray 26 into the receiving position illustrated in FIGURE 1 and resists downward pivotation of the tray by finger pressure exerted on the finger tip trigger 17.

OPERATION

In the operation of the nutcracker, the ratchet rod 12 is first manually rotated about its longitudinal axis from the position illustrated in FIGURE 1 through an angle of 90° to 180° so that the rod can slide backward or forward across the ratchet dog 21 and pressure dog 23 without its teeth engaging these members. In preparing to crack a nut, the ratchet rod 12 is rotated in the manner described and pulled backward to a retracted position similar to the position shown in FIGURE 1. The rod 12 is then rotated back to its ratchet dog engaging position. A nut is placed in the nut chamber between the crusher cup 13 and the receiving cup 14 above the nut receiving tray 16.

To crack the nut the trigger 19 is pulled toward the handle portion of the frame 10 against the bias of the spring 18. This moves the ratchet dog 21 forward (toward the transverse wall 11) and its engagement with the ratchet rod 12 causes this rod to advance by an increment equivalent to the travel of the ratchet dog 21. This movement of the ratchet rod pushes the nut toward the receiving cup 14 in the nut chamber. The trigger 19 is then released and is biased by the pressure spring 18 to its forward position. The ratchet dog 21 slips backwards across the ratchet teeth of the ratchet rod 12 to engage the next tooth in a rearward direction.

Pulling of the trigger 19 is repeated several times until the nut is placed in compression between the crusher cup 13 and receiving cup 14. At this time the ratchet rod 12 is prevented from backing out through the opening 28 by the engagement of the pressure dog 23 therewith. One or two more actuations of the trigger result in the nut being cracked between the crusher cup 13 and the receiving cup 14. After the nut is cracked, the ratchet rod 12 is rotated and retracted rearwardly to release the cracked nut, which falls downwardly onto the nut receiving tray 26. The finger tip trigger 17 is then gripped and pulled toward the trigger 19. This pivots the nut receiving tray 26 downwardly to allow the cracked nut to be discharged into a suitable receptacle.

What is claimed is:
1. A nutcracker comprising:
   a frame having a pistol grip handle portion and a nut chamber portion secured to, and extending from, the handle portion;
   a ratchet rod extending through said frame into the nut chamber portion thereof and reciprocably mounted in said frame for reciprocating movement into said nut chamber portion, said ratchet rod having ratchet teeth thereon;
   means in said nut chamber portion positioned to face said ratchet rod whereby a nut can be positioned between said means and said ratchet rod in the line of movement of said ratchet rod;
   a nut receiving tray positioned below, and extending substantially parallel to, the line of movement of said ratchet rod, said nut receiving tray forming a bottom wall for said nut chamber and being pivotally mounted on said nut chamber portion for pivotation out of parallelism with said line of movement of said ratchet rod;
   a trigger pivotally connected to said handle portion; and
   a ratchet dog mounted in said trigger and movable with said trigger when said trigger is pivoted relative to said handle portion, said ratchet dog cooperating with the ratchet teeth on said ratchet rod to advance said ratchet rod when said trigger is pivoted.

2. A nutcracker as defined in claim 1 wherein said frame is an integral member having said nut chamber portion extending substantially normal to said handle portion.

3. A nutcracker as defined in claim 1 and further characterized to include a pressure dog engaging the teeth on said ratchet rod for preventing movement of said ratchet rod away from said nut chamber portion.

4. A nutcracker as defined in claim 3 wherein said ratchet rod is mounted in said frame for rotation about its longitudinal axis, and carries said teeth on one side thereof whereby said ratchet rod can be rotated about its longitudinal axis to disengage said teeth from said ratchet dog and pressure dog and permit withdrawal of said ratchet rod from said nut chamber portion.

5. A nutcracker as defined in claim 1 wherein said nut receiving tray is semi-cylindrical in cross-sectional configuration.

6. A nutcracker as defined in claim 1 and further characterized to include a crusher cup secured to an end of said ratchet rod inside said nut receiving chamber; and wherein said means comprises a nut receiving cup.

7. A nutcracker as defined in claim 6 and further characterized to include a presure dog pivotally mounted in said frame and releasably engaging the ratchet teeth on said ratchet rod for preventing movement of said ratchet rod away from said nut chamber portion.

8. A nutcracker as defined in claim 7 wherein said ratchet rod is mounted in said frame for rotation about its longitudinal axis and carries said teeth on one side thereof whereby said rod can be rotated about its axis to disengage said teeth from said ratchet dog and pressure dog and permit withdrawal of said ratchet rod from said nut chamber portion.

References Cited

UNITED STATES PATENTS

| | | | |
|---|---|---|---|
| 1,192,846 | 8/1916 | Boyer | 146—16 |
| 1,987,399 | 1/1935 | Harris | 146—16 |
| 2,526,273 | 10/1950 | Rimes | 146—16 |
| 3,223,133 | 12/1965 | Brookey | 146—16 |

W. GRAYDON ABERCROMBIE, Primary Examiner